US 7,088,383 B2

(12) United States Patent
Baek et al.

(10) Patent No.: US 7,088,383 B2
(45) Date of Patent: Aug. 8, 2006

(54) METHOD OF REGISTERING A MOLDED LENSLET ARRAY WITH AN ARRAY OF LIGHT EMITTING ELEMENTS

(75) Inventors: Seung-Ho H. Baek, Pittsford, NY (US); Wesley H. Bacon, Pittsford, NY (US); Roger S. Kerr, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 379 days.

(21) Appl. No.: 10/640,197

(22) Filed: Aug. 13, 2003

(65) Prior Publication Data

US 2005/0046950 A1 Mar. 3, 2005

(51) Int. Cl.
*B41J 2/45* (2006.01)
(52) U.S. Cl. ...................................... 347/238
(58) Field of Classification Search ................ 347/238, 347/241–242, 244, 256–258, 130; 355/40; 313/500; 200/86.5; 430/321; 257/79–85
See application file for complete search history.

(56) References Cited

U.S. PATENT DOCUMENTS

| 4,339,209 A | | 7/1982 | Tanigami | 400/142 |
|---|---|---|---|---|
| 4,440,846 A | | 4/1984 | Sanders et al. | 430/138 |
| 4,965,417 A | * | 10/1990 | Massie | 200/86.5 |
| 5,605,783 A | * | 2/1997 | Revelli et al. | 430/321 |
| 6,034,712 A | | 3/2000 | Iwasaki | 347/241 |
| 6,118,514 A | * | 9/2000 | Iwasaki | 355/40 |
| 6,809,470 B1 | * | 10/2004 | Morley et al. | 313/500 |

* cited by examiner

*Primary Examiner*—Hai Pham
(74) *Attorney, Agent, or Firm*—Nelson Adrian Blish

(57) ABSTRACT

A method of registering a molded lenslet array (14) with an array of light emitting elements (54) includes etching an array of light source registration recesses (42) in a silicon pad (28). At least two registration recesses (30) are etched in the silicon pad. The registration recesses and the light source registration recesses have the same depth. Sidewalls of the registration recesses and the light source registration recesses have the same slope angle. A light emitting element is located in at least one of the light source registration recesses. The molded lenslet array is located at a predetermined distance from the bottom of the registration recesses (36). The molded lenslet array which is in a x-direction is located by matching a tapered locating surface of a first and second registration pin (72, 74) to a first and second tapered locating surface (68, 70) of a first and second registration recess (76, 78). The molded lenslet array is located in a y-direction by matching a first tapered locating surface (68) of a first registration pin (72) to a second tapered locating surface (70) of the first registration recess (76).

22 Claims, 5 Drawing Sheets

METHOD OF REGISTERING A MOLDED LENSLET ARRAY WITH AN ARRAY OF LIGHT EMITTING ELEMENTS

CROSS REFERENCE TO RELATED APPLICATIONS

Reference is made to commonly-assigned copending U.S. patent application Ser. No. 10/640,201, filed Aug. 13, 2003, entitled A METHOD OF MANUFACTURING A MOLDED LENSLET ARRAY, by Kerr et al., the disclosure of which is incorporated herein.

FIELD OF THE INVENTION

The present invention relates in general to a multiple channel image exposure device for exposing photosensitive media and more particularly to the fabrication and alignment of a molded lenslet array to an array of one-dimensional or two-dimensional multiple light emitting elements to form a multiple channel image exposure device.

BACKGROUND OF THE INVENTION

Multiple channel image exposure devices having multiple light emitting elements are used in imaging equipment to expose images on photosensitive media. Such a device is described in U.S. Pat. No. 6,034,712, which uses an array of light emitting light elements disposed within recesses formed in a substrate, with a pinhole mask, to expose an image on photosensitive media. The photosensitive media may be of the type having a plurality of microcapsules with an encapsulated image-forming material.

To form an image on a photosensitive media having microcapsules, a multiple channel image exposure device exposes certain microcapsules with at least one of the multiple light emitting elements. Exposure by the multiple channel exposure device hardens selected microcapsules. Pressure is used to rupture unexposed microcapsules. The exposed microcapsules are not broken. The ruptured microcapsules release the encapsulated image-forming material to form an image within the photosensitive material. Similar imaging forming equipment is described in U.S. Pat. Nos. 4,440,846 and 4,339,209.

Multiple channel image exposure devices must be aligned accurately. Depending on the application and image resolution, the alignment accuracy may be required to be within a few microns to prevent image artifacts from being generated in an image formed on the photosensitive media due to misalignment of the multiple channel image exposure device. This becomes increasingly important at higher image resolution. Alignment becomes complicated and expensive as the number of imaging channels increases. Alignment is even more expensive if the alignment of each imaging channel is done manually. Thus, a there is a need for improved image quality and lower cost by improving the fabrication and alignment accuracy between the molded lenslet array and the array of multiple light emitting elements of the multiple channel image exposure device.

SUMMARY OF THE INVENTION

Briefly, according to one aspect of the present invention a method of registering a molded lenslet array with an array of light emitting elements comprises etching an array of light source alignment recesses in a silicon pad. At least two registration recesses are etched in the silicon pad. The registration recesses and the light source alignment recesses have the same depth. Sidewalls of the registration recesses and the light source alignment recesses have the same slope angle. A light emitting element is located in at least two of the light source alignment recesses. The molded lenslet array is located at a predetermined distance from the bottom of the registration recesses. The molded lenslet array is located in a x-direction by matching a first tapered locating surface of a first registration pin to a first tapered locating sidewall of a first registration recess and a second tapered locating surface of a second registration pin to a second tapered locating sidewall of a second registration recess. The molded lenslet array is located in y-direction by matching the first tapered locating surface of the first registration pin to a second tapered locating sidewall of the first registration recess.

The present invention is intended to lower the cost while improving the image quality of an imaging apparatus that uses a multiple channel imaging device to generate an image on or within a photosensitive media preferably, but not limited to a photosensitive media having a plurality of microcapsules with an encapsulated image-forming material. When exposed by a multiple channel image exposure device, microcapsules become hardened to a point that when processed through a microcapsule rupturing device, the exposed microcapsules are not crushed and the unexposed microcapsules are ruptured releasing the image-forming material encapsulated within the microcapsules to form an image.

The multiple channel image exposure device of the present invention utilizes a molded lenslet array accurately aligned to an array of one-dimensional or two-dimensional multiple light emitting elements to form a multiple channel image exposure device. To improve the alignment accuracy between the multiple light emitting elements and molded lenslet array, while lowering the cost of the device, a silicon wafer is lithographically fabricated. Registration recesses and light source alignment recesses are matched to the same number and size of the multiple light emitting elements (laser diode or LED chips) and alignment pins formed on the molded lenslet array. The design of the molded lenslet array is such that the angle of the alignment pins formed in the molded lenslet array match the angle of the alignment recesses formed by the lithographic fabrication process used to manufacture the alignment recesses in the silicon pad. The accuracy of micro-lithographic mask and fabrication process allow the light emitting elements (laser diode or LED chips) to be accurately placed at pre-designated positions in the light source alignment recesses.

The invention and its objects and advantages will become more apparent in the detailed description of the preferred embodiment presented below.

BRIEF DESCRIPTION OF THE DRAWINGS

A more complete understanding of the invention and its advantages will become apparent from the detailed description taken in conjunction with the accompanying drawings, wherein examples of the invention are shown, and identical reference numbers have been used, where possible, to designate identical elements that are common to the figures referenced below.

DETAILED DESCRIPTION OF THE INVENTION

The present invention will be directed in particular to elements forming part of, or in cooperation more directly with an apparatus in accordance with the present invention. It is to be understood that elements not specifically shown or described may take various forms well known to those skilled in the art.

Figure 1:
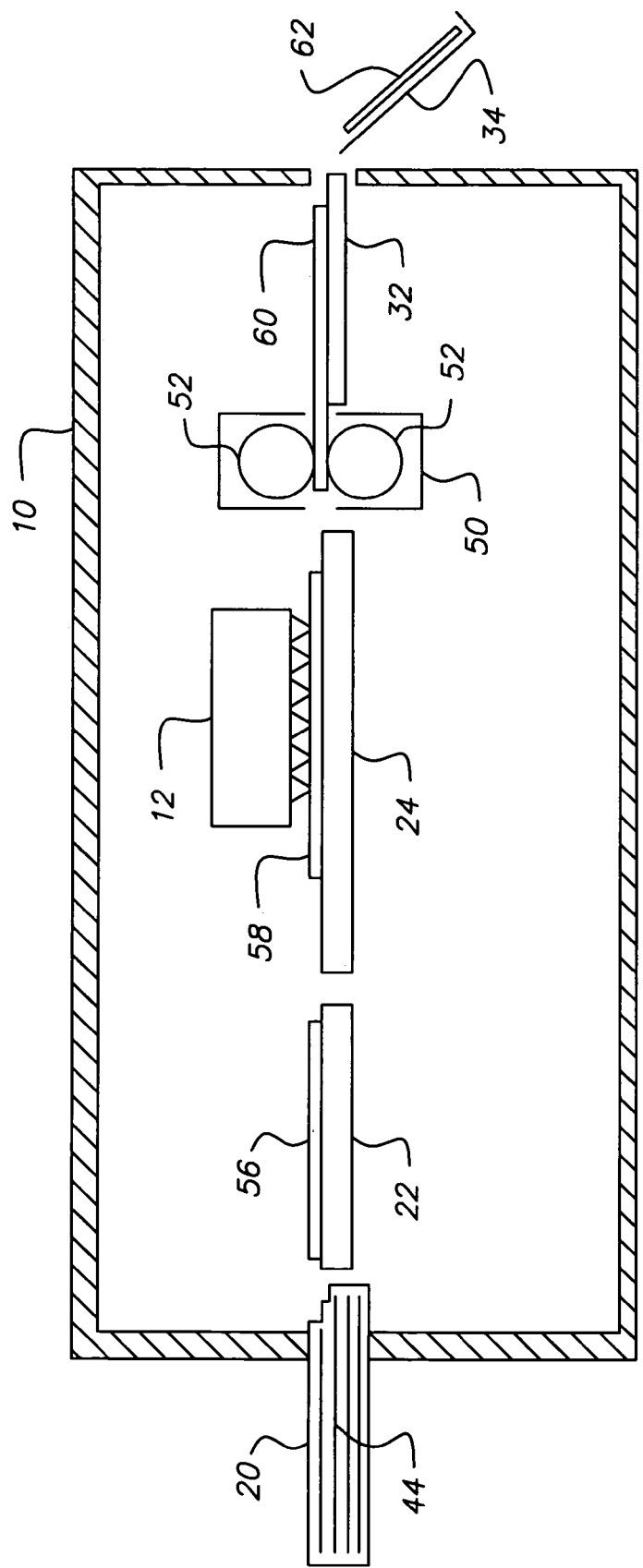
FIG. 1 is a schematic, cross sectional view of an imaging apparatus having a multiple channel image exposure device according to the present invention.

Referring now to FIG. 1, a schematic cross sectional view of an imaging apparatus 10 for exposing photosensitive media 44 according to the present invention is shown. A multiple channel image exposure device 12 exposes photosensitive media 44.

Photosensitive media 44 is removed from media tray 20 to the preheat station 22. Once the preheat step is complete the preheated photosensitive media 56 proceeds to the exposure station 24 to be image wise exposed by the multiple channel image exposure device 12. The exposed photosensitive media 58 is then passed through the microcapsule rupturing device 50 where pressure is applied by rupturing rollers 52. The developed photosensitive media 60 is then passed to the post heating station 32 and from there to the exit tray 34 as a competed image 62.

Figure 2:
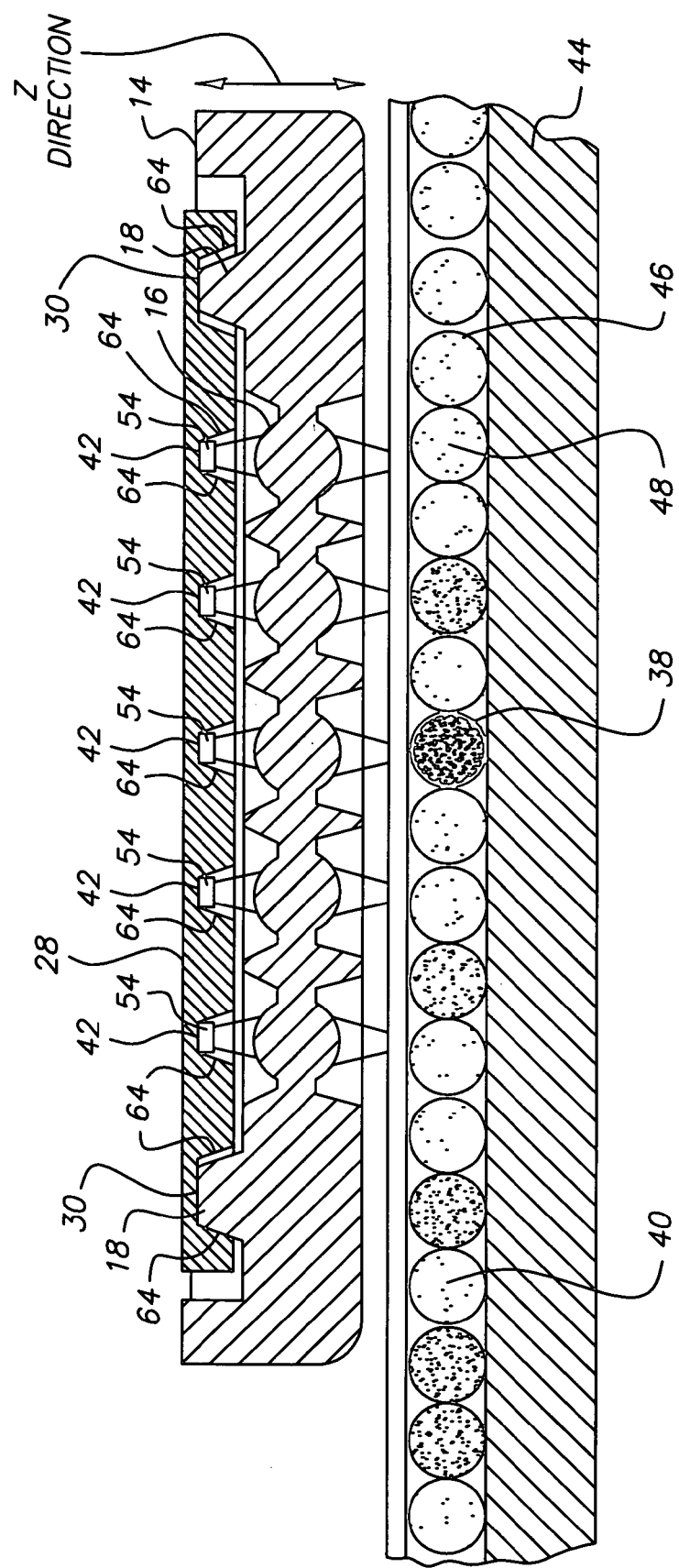
FIG. 2 is a schematic, cross sectional view of a multiple channel image exposure device according to one embodiment of the present invention.

FIG. 2 shows a schematic cross sectional view of the multiple channel image exposure device 12 shown in FIG. 1. A molded lenslet array 14 is in alignment with an array of light emitting elements 54 that are mounted on silicon pad 28 within light source alignment recesses 42. Light emitting elements 54 can be attached by means of soldering, adhesive bonding, or other methods well known in the art. Light emitting elements 54 can be laser diodes or light emitting diodes (LEDs).

Registration of the molded lenslet array 14 to the array of light emitting elements 54 is accomplished by registration pins 18 that interface with registration recesses 30. Preferably, there are at least three registration pins 18 and at least three registration recesses 30, but alignment could be done with two registration pins 18 and two registration recesses 30.

Registration recesses 30 and light source alignment recesses 42 are etched into silicon pad 28 by micro-lithographic mask and fabrication process. The micro-lithographic mask and fabrication process forms the tapered sidewalls 64 of the registration recesses 30 and light source alignment recesses 42 at an angle between 45 degrees-75 degrees. Both the registration recesses 30 and light source alignment recesses 42 will be formed at the same slope angle and the same depth such that the length of the registration pins 18 and the depth of the registration recesses 30 locate the imaging lenses 16 formed in the molded lenslet array 14 to a predetermined distance in the z-direction from the array of light emitting elements 54. The bottom of the light source alignment recesses 84 and the bottom of the registration recesses 30 determine the depth. In the preferred embodiment the molded lenslet array 14 is molded of a polyolefin or other materials well known by someone in the art.

The photosensitive media 44 is of the type having a plurality of microcapsules 46 with an image-forming material 48 encapsulated within the microcapsules 46. Image wise exposure of the desired microcapsules 46 in photosensitive media 44 in an imaging apparatus 10 by a multiple channel image exposure device 12 hardens the exposed microcapsules 38. When photosensitive media 44 is processed through a microcapsule rupturing device 50, rupturing roller 52 generates pressure to rupture the unexposed microcapsules 40, however, it is unable to rupture the exposed microcapsules 38. Rupturing the unexposed microcapsules 40 releases the image-forming material 48 encapsulated within the unexposed microcapsules 40 to form an image within the photosensitive media 44.

Figure 3:
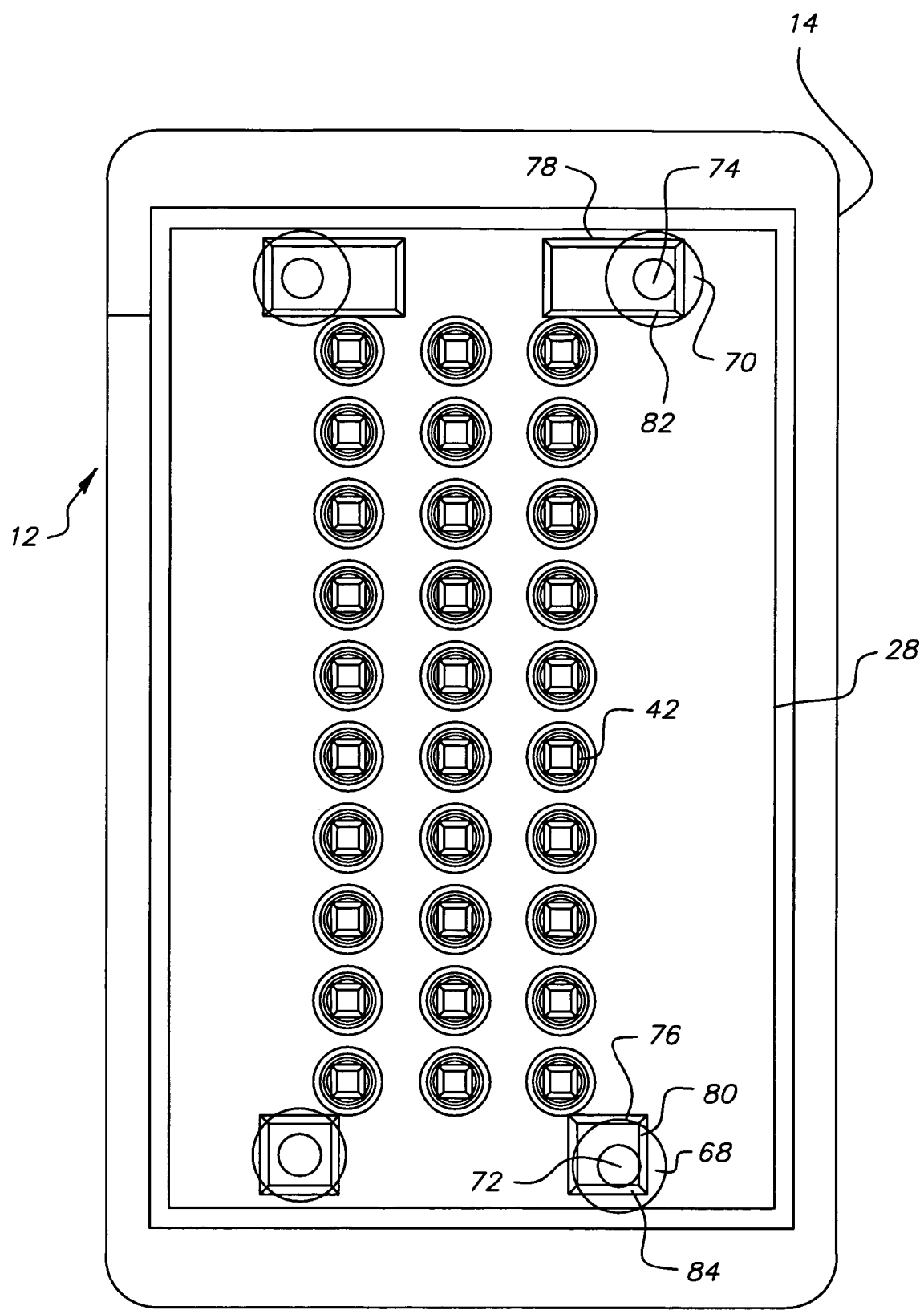
FIG. 3 is a top view of a multiple channel image exposure device of one embodiment according to the present invention.
Figure 4:
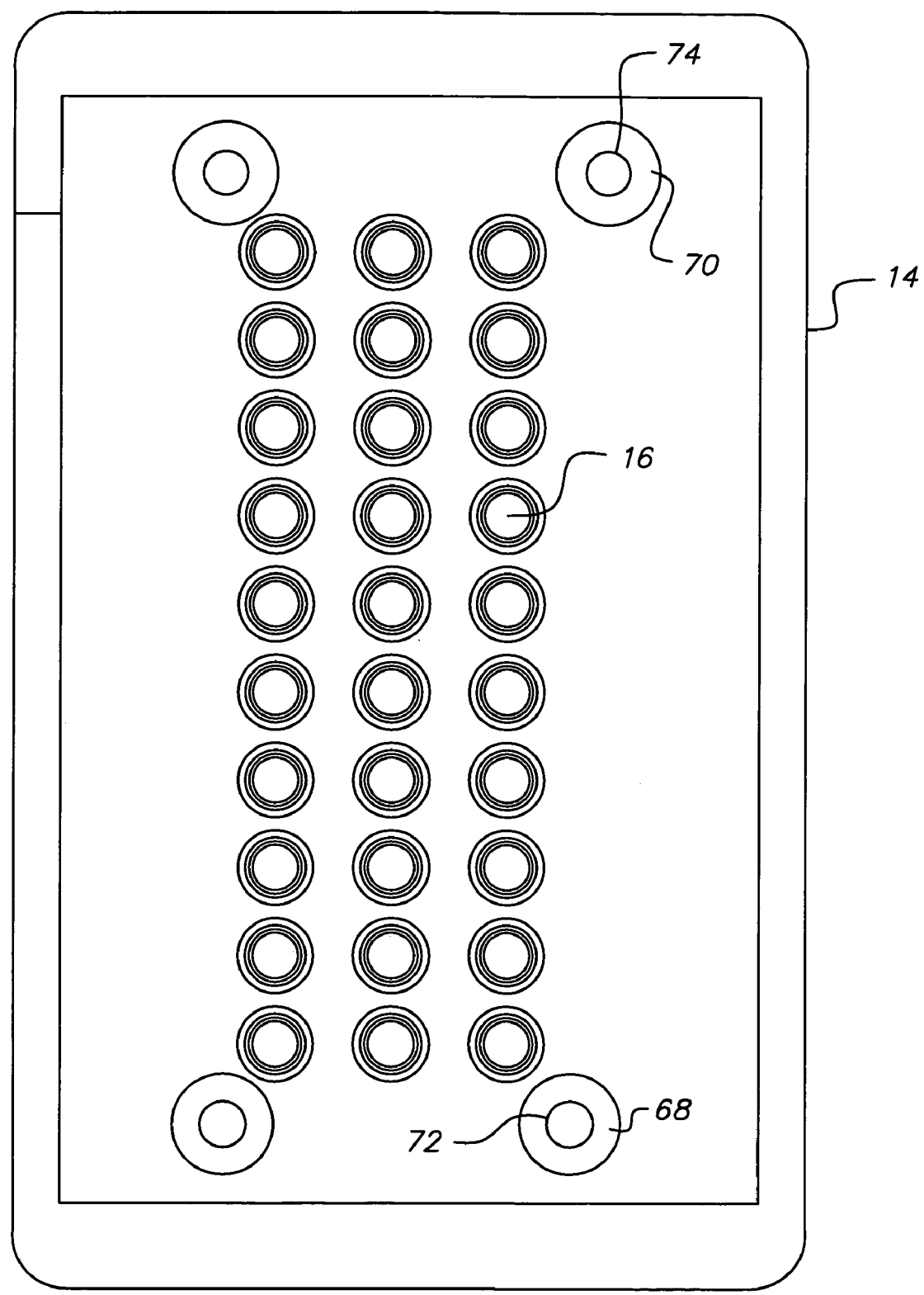
FIG. 4 is a top view of a molded lenslet array according to the present invention.
Figure 5:
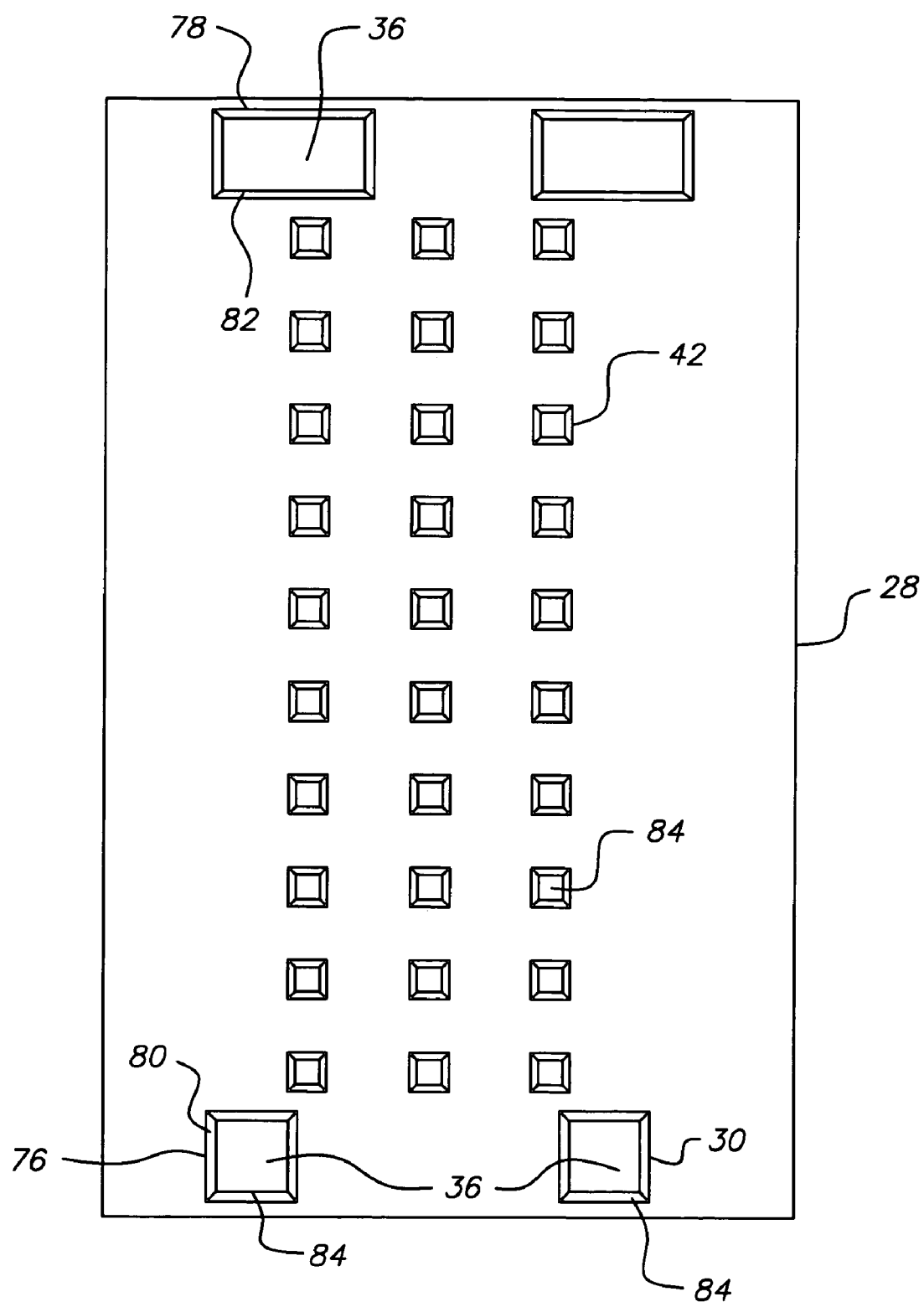
FIG. 5 is a bottom view of a silicon pad according to the present invention.

FIG. 3 shows a top view of a multiple channel image exposure device 12 showing the alignment of the molded lenslet array 14 to the silicon pad 28 in the x-direction by matching the first tapered locating surface 68 of a first registration pin 72, also be seen in FIG. 4, to a first tapered locating sidewall 80 of a first registration recess 76 that, also seen in FIG. 5. A second tapered locating surface 70 of a second registration pin 74 is matched to a second tapered locating sidewall 82 of a second registration recess 78. In the y-direction, locating the molded lenslet array 14 is accomplished by matching the first tapered locating surface 68 of the first registration pin 72 to a second tapered locating sidewall 82 of said first registration recess 76.

The invention has been described in detail with particular reference to certain preferred embodiments thereof, but it will be understood that variations and modifications can be effected within the scope of the invention.

PARTS LIST

10. Imaging apparatus
12. Multiple channel image exposure device
14. Molded lenslet array
16. Imaging lens
18. Alignment pin
20. Media tray
22. Preheat station
24. Exposure station
28. Silicon pad
30. Registration recess
32. Post heating station
34. Media exit tray
36. Bottom of a registration recess
38. Exposed microcapsule
40. Unexposed microcapsule
42. Light source alignment recess
44. Photosensitive media
46. Microcapsule
48. Image-forming material
50. Microcapsule rupturing device
52. Rupturing roller
54. Array of light emitting elements
56. Preheated photosensitive media
58. Exposed photosensitive media
60. Developed photosensitive media
62. Completed image
64. Tapered sidewalls
68. First tapered locating surface
70. Second tapered locating surface
72. First registration pin
74. Second registration pin 76. First registration recess
78. Second registration recess
80. First tapered sidewall
82. Second tapered sidewall
84. Bottom of a light source alignment recesses

What is claimed is:

1. A method of registering a molded lenslet array with an array of light emitting elements comprising:
    etching an array of light source alignment recesses in a silicon pad;
    etching at least two registration recesses in said silicon pad;
    wherein said registration recesses and said light source alignment recesses have a same depth;
    wherein sidewalls of said registration recesses and said light source alignment recesses have a same slope angle;
    locating a light emitting element in at least two of said light source alignment recesses;
    locating said molded lenslet array a predetermined distance from said bottoms of said registration recesses;
    locating said molded lenslet array in an x-direction by matching a first tapered locating surface of a first registration pin to a first tapered locating sidewall of a first registration recess and a second tapered locating surface of a second registration pin to a second tapered sidewall of a second registration recess; and
    locating said molded lenslet array in a y-direction by matching a first tapered locating surface of said first registration pin to a second tapered locating sidewall of said first registration recess.

2. A method as in claim 1 wherein locating each of said light emitting elements in each of said light source alignment recesses comprises soldering.

3. A method as in claim 1 wherein locating each of said light emitting elements in each of said light source alignment recesses comprises adhesive bonding.

4. A method as in claim 1 wherein said slope angle of said registration recesses is between 45 degrees-75 degrees.

5. A method as in claim 1 wherein said molded lenslet array is comprised of polyolefin.

6. A method as in claim 1 wherein light emitting elements are light emitting diodes (LED).

7. A method as in claim 1 wherein light emitting elements are laser diodes.

8. A method as in claim 1 wherein said molded lenslet array has at least three registration pins and said silicon pad has at least three registration recesses.

9. A method of registering a molded lens with a light emitting element comprising:
    etching a light source alignment recess in a silicon pad;
    etching at least two registration recesses in said silicon pad;
    wherein said registration recesses and said light source alignment recess has a same depth;
    wherein said registration recesses and said light source registration recesses have a same slope angle;
    locating a light emitting element in said light source registration recess;
    locating said lens a predetermined distance above said light emitting element by matching a length of a registration pin on said molded lens with said depth of said registration recess;
    locating said molded lens in a x direction by matching a first tapered locating surface of a first registration pin to a first tapered locating sidewall of a first registration recess and a second tapered locating surface of a second registration pin to a second tapered sidewall of a second registration recess; and
    locating said molded lenslet array in a y direction by matching a first tapered locating surface of said first registration pin to a second tapered locating sidewall of said first registration recess.

10. A method as in claim 9 wherein locating said light emitting elements in each of said light source registration recess comprises soldering.

11. A method as in claim 9 wherein locating said light emitting elements in said light source registration recess comprises adhesive bonding.

12. A method as in claim 9 wherein said slope angle of said registration recesses is between 45 degrees-75 degrees.

13. A method as in claim 9 wherein said molded lens is comprised of polyolefin.

14. A method as in claim 9 wherein light emitting element is a light emitting diode (LED).

15. A method as in claim 9 wherein light emitting element is a laser diode.

16. A method as in claim 9 wherein said molded lens has at least three registration pins and said silicon pad has at least three registration recesses.

17. A method of registering a molded lens with a light emitting element comprising:
    locating a light emitting light element in a light source registration recess;
    locating said molded lens a predetermined distance above said light emitting element by matching a length of registration pins on said molded lens with a depth of a registration recess;
    locating said molded lenslet array in a x direction by matching a first tapered locating surface of a first registration pin to a first tapered locating sidewall of a first registration recess and a second tapered locating surface of a second registration pin to a second tapered sidewall of a second registration recess;
    locating said molded lenslet array in a y direction by matching said first tapered locating surface of said first registration pin to a second tapered locating sidewall of said first registration recess; and
    wherein said registration recesses and said light source registration recesses have a same depth.

18. A method as in claim 17 wherein said registration recesses and said light source registration recesses have a same slope angle.

19. A method as in claim 17 wherein said slope angle of said registration recesses is between 45 degrees-75 degrees.

20. A method as in claim 17 wherein said molded lens is comprised of polyolefin.

21. A method as in claim 17 wherein light emitting element is a light emitting diode (LED).

22. A method as in claim 17 wherein light emitting element is a laser diode.

* * * * *